(12) United States Patent  
Huang et al.

(10) Patent No.: US 8,022,876 B2  
(45) Date of Patent: Sep. 20, 2011

(54) INDOOR LOCALIZATION SYSTEM AND METHOD

(75) Inventors: Polly Huang, Taipei (TW); Tsung-Han Lin, Taipei (TW)

(73) Assignee: National Taiwan University (TW)

( * ) Notice: Subject to any disclaimer, the term of this patent is extended or adjusted under 35 U.S.C. 154(b) by 225 days.

(21) Appl. No.: 12/472,078

(22) Filed: May 26, 2009

(65) Prior Publication Data

US 2010/0134356 A1  Jun. 3, 2010

(30) Foreign Application Priority Data

Nov. 28, 2008 (TW) .............................. 97146248 A

(51) Int. Cl. *G01S 3/02* (2006.01)
(52) U.S. Cl. .......................... 342/451; 342/463; 342/464
(58) Field of Classification Search .................. 342/451, 342/463, 464
See application file for complete search history.

(56) References Cited

U.S. PATENT DOCUMENTS

2004/0061646 A1* 4/2004 Andrews et al. ............. 342/463
2005/0243936 A1* 11/2005 Agrawala et al. ............ 375/259
2007/0061245 A1* 3/2007 Ramer et al. ................. 705/37
2011/0004072 A1* 1/2011 Fletcher et al. .............. 600/300

OTHER PUBLICATIONS

Wikipedia, "Universal Serial Bus", created 2001, http://en.wikipedia.org/wiki/Universal_Serial_Bus.*

* cited by examiner

*Primary Examiner* — Thomas Tarcza
*Assistant Examiner* — Frank McGue
(74) *Attorney, Agent, or Firm* — Baker & McKenzie LLP

(57) ABSTRACT

An indoor localization method is implemented using an indoor localization system that includes beacons in an indoor space and each periodically transmitting a localization signal, a radio badge receiving the localization signals, and a host coupled to the beacons and the radio badge. The beacons transmit the localization signals asynchronously. The indoor localization method includes a training phase and a tracking phase. During the training phase, signal vectors are formed from the localization signals received by the radio badge, and a signal ID value is generated from the signal vectors. During the tracking phase, signal vectors are formed from the localization signals received by the radio badge at a current location. An estimated position of the radio badge is obtained using the signal vectors of the tracking phase and the signal ID values.

21 Claims, 4 Drawing Sheets

INDOOR LOCALIZATION SYSTEM AND METHOD

CROSS-REFERENCE TO RELATED APPLICATION

This application claims priority of Taiwanese Application No. 097146248, filed on Nov. 28, 2008.

BACKGROUND OF THE INVENTION

1. Field of the Invention

The present invention relates to an indoor localization system and method, more particularly to an indoor localization system and method, in which beacons of the indoor localization system are de-synchronized.

2. Description of the Related Art

Most outdoor localization systems and methods are based on global positioning system (GPS) technology. Depending on the quality of the GPS receiver hardware employed by a user, the manner in which processing is performed by the GPS receiver, and various other factors, errors in the estimated position may range from several meters to several tens of meters using GPS technology.

Since such large errors are unacceptable for indoor localization, one approach is to use wireless technology. In particular, indoor localization systems that employ a Radio Signal Strength Indicator (RSSI)-signature-based approach have been developed. The RSSI-signature-based approach involves detecting the received strengths of wireless signals transmitted from a plurality of beacons that are deployed in various fixed locations. The strengths of the signals received by a radio badge or tag are then used to estimate the indoor location of a tracked target.

One area that is in need of improvement to enhance accuracy in indoor localization systems is that related to optimizing communication between the radio badge or tag and each of the beacons.

SUMMARY OF THE INVENTION

Therefore, the object of the present invention is to provide an indoor localization system and method, in which beacons of the indoor localization system are de-synchronized, such that collisions among localization signals transmitted by the beacons are prevented.

According to one aspect of this invention, an indoor localization system comprises a plurality of beacons deployed in the indoor space and each periodically transmitting a localization signal, a radio badge carried by a tracked target in the indoor space for receiving the localization signals from the beacons, and a host communicatively coupled to the beacons and the radio badge.

One of the radio badge and the host performs at least one step of an indoor localization method of this invention, and the other of the radio badge and the host performs the remaining steps of the indoor localization method of this invention.

According to another aspect, the indoor localization method of this invention comprises: configuring the beacons to transmit the localization signals thereof asynchronously; during a training phase, forming a plurality of signal vectors respectively from the localization signals received by the radio badge at each of predetermined locations in the indoor space, and generating a signal ID value from the signal vectors for each of the beacons from which the radio badge has received the localization signals; during a tracking phase, again forming a plurality of signal vectors respectively from the localization signals received by the radio badge at a current location of the tracked target in the indoor space; and obtaining an estimated position of the radio badge using the signal vectors formed during the tracking phase and the signal ID values generated in the training phase.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
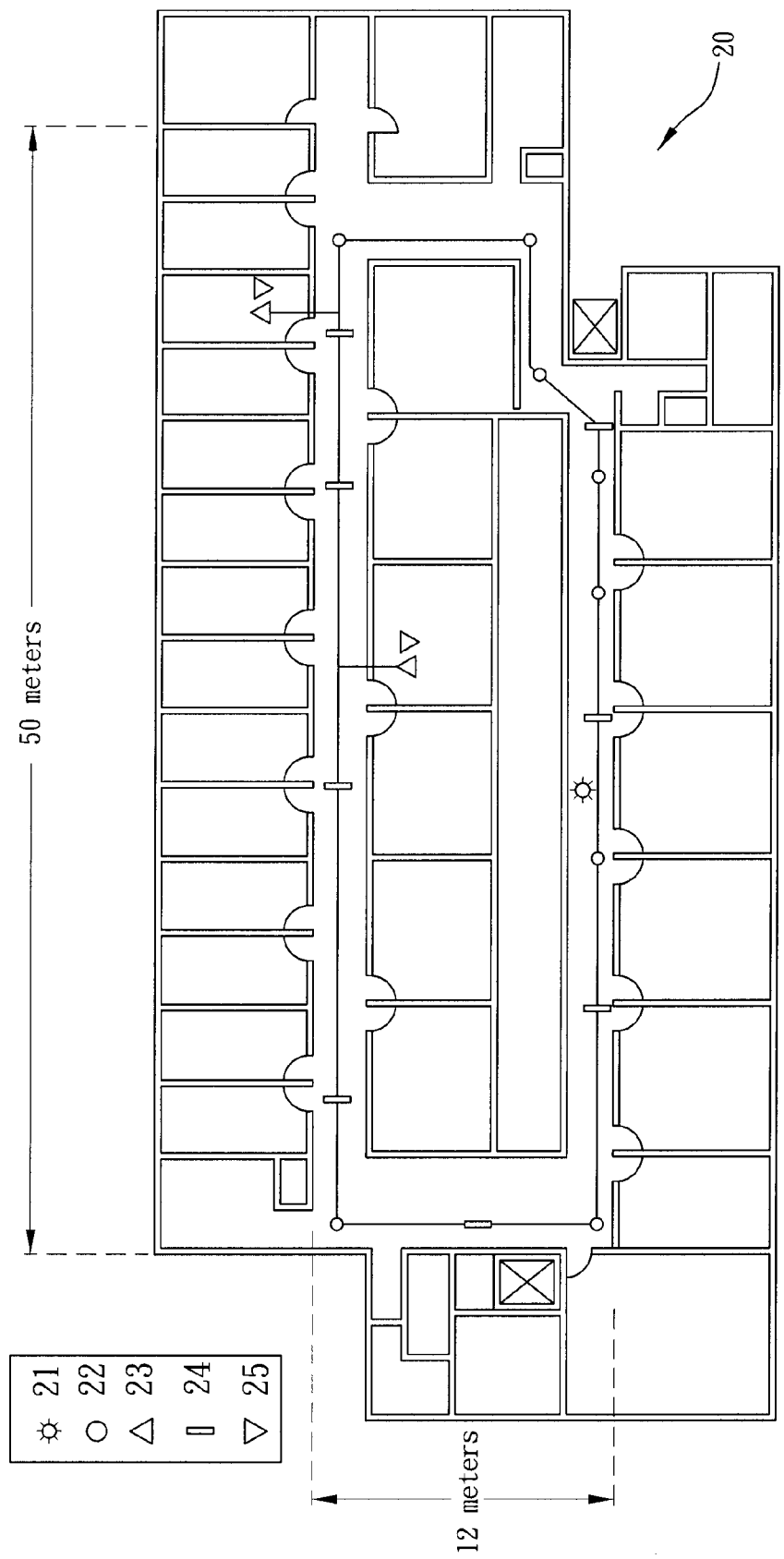
FIG. 1 is a schematic diagram of an indoor localization system according to a preferred embodiment of the present invention, illustrating the indoor localization system in a layout used to perform a field test in an indoor space.

FIG. 1 is a schematic diagram of an indoor localization system according to a preferred embodiment of the present invention. In FIG. 1, the indoor localization system is provided in an exemplary layout in an indoor space 20 for purposes of performing a field test.

In one embodiment, the indoor localization system of the present invention includes a radio badge 21, a plurality of beacons 22, two hosts 23, a plurality of universal serial bus (USB) hubs 24, and two power supplies 25. The USB hubs 24 and the power supplies 25 will be described at a later point in the description, that is, during the explanation of the field test. Furthermore, for the explanation to follow immediately below, it is assumed that there is only one host 23.

The beacons 22 are deployed in the indoor space 20. Each of the beacons 22 periodically transmits a localization signal. In one embodiment, each of the localization signals transmitted by each of the beacons 22 is a short packet containing an ID of the beacon 22.

The radio badge 21 is carried by a tracked target moving in the indoor space 20. The radio badge 21 receives the localization signals from the beacons 22.

The host 23 is communicatively coupled to the beacons 22 and the radio badge 21.

Figure 2:
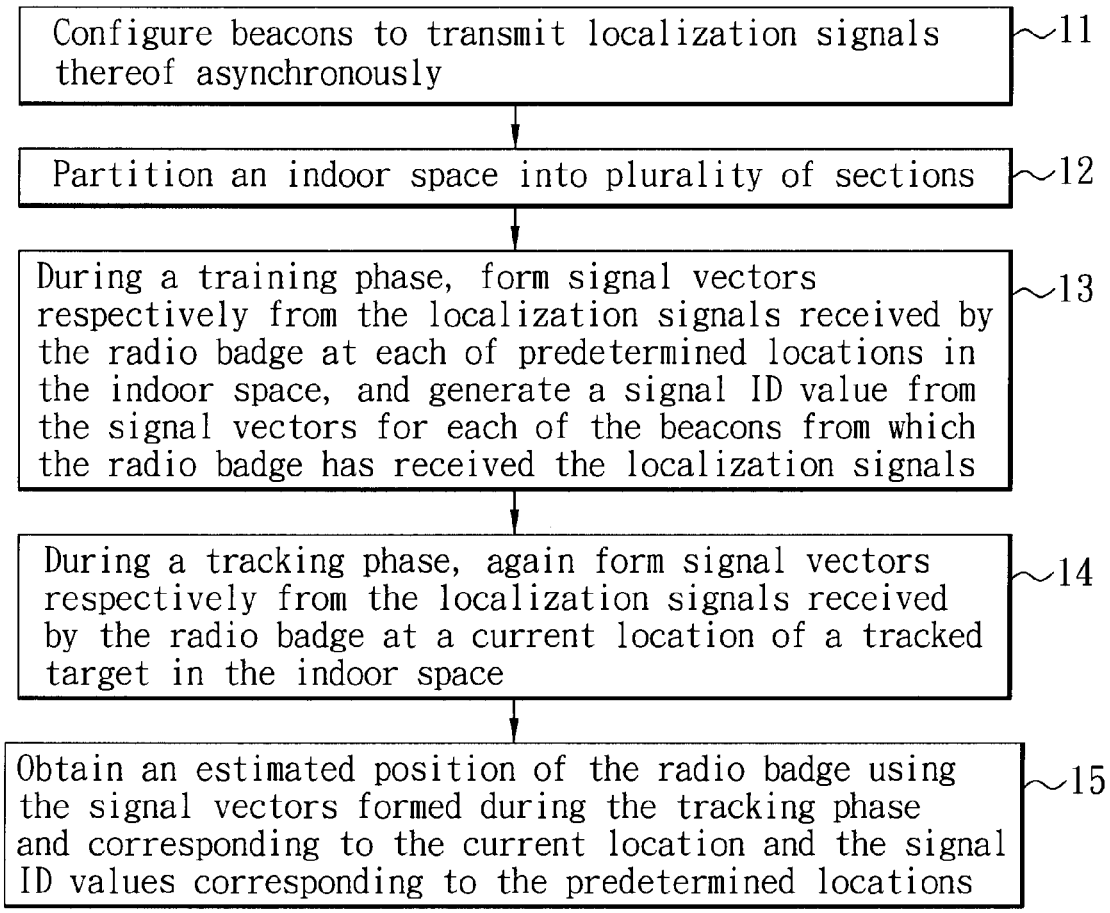
FIG. 2 is a flowchart of an indoor localization method according to a preferred embodiment of the present invention.

One of the radio badge 21 and the host 23 performs at least one step of an indoor localization method according to a preferred embodiment of the present invention, and the other of the radio badge 21 and the host 23 performs the remaining steps of the indoor localization method. The indoor localization method of the present invention will now be described with further reference to FIG. 2.

First, in step 11, the beacons 22 are configured to transmit the localization signals thereof asynchronously (i.e., configuration is performed such that the beacons 22 are de-synchronized). In one embodiment, a timing at which each of the beacons 22 transmits the localization signal thereof is adjusted according to a comparison with timings at which neighboring beacons 22 transmit localization signals, such that collisions among the localization signals transmitted by the beacons 22 are prevented.

The asynchronous transmission of the localization signals by the beacons 22 may be realized using one of the DESYNC algorithms disclosed in "DESYNC: Self-Organizing Desynchronization and TDMA on Wireless Sensor Networks," written by Julius Degesys, Ian Rose, Ankit Patel, Radhika Nagpal.

Next, in step 12, the indoor space 20 is partitioned into a plurality of sections that serve as predetermined locations, respectively. In one embodiment, the sections of the indoor space 20 are partitioned in a grid configuration. In one embodiment, each of the sections is rectangular and extends for approximately 30 cm in a lengthwise direction. This particular dimension of 30 cm for the sections of the indoor space 20 is chosen since it corresponds roughly to the typical walking stride length.

Subsequently, in step 13, during a training phase, a plurality of signal vectors are formed respectively from the localization signals received by the radio badge 21 at each of the predetermined locations in the indoor space 20, and a signal ID value is generated from the signal vectors for each of the beacons 22 from which the radio badge 21 has received the localization signals. In one embodiment, the signal ID value for each of the beacons 22 from which the radio badge 21 has received the localization signals is generated by averaging the signal vectors that are formed from the localization signals received at one of the predetermined locations from a corresponding one of the beacons 22 during the training phase.

Next, in step 14, during a tracking phase, a plurality of signal vectors are again formed respectively from the localization signals received by the radio badge 21 at a current location of the tracked target in the indoor space 20.

In one embodiment, each of the beacons 22 periodically transmits the localization signal thereof at a predetermined signal-sending interval of 200 ms. In such an embodiment, in step 13, the training phase extends for 40 units of the signal-sending interval, such that each of the signal ID values is formed from 40 of the signal vectors, and in step 14, the tracking phase extends for approximately 220 ms.

Finally, in step 15, an estimated position of the radio badge 21 is obtained using the signal vectors formed during the tracking phase and corresponding to the current location and the signal ID values corresponding to the predetermined locations.

In one embodiment, in step 15, a k-nearest-neighbor (KNN) algorithm is employed to obtain the estimated position of the radio badge 21. Using the KNN algorithm, a plurality of distances between the signal vectors formed during the tracking phase and corresponding to the current location, and the signal ID values corresponding to the predetermined locations are calculated, reference values are acquired by dividing each of the distances by the number of the signal vectors formed during the tracking phase, a plurality of target values are acquired from a subset of the reference values including a predetermined number of the smallest reference values, and an estimated position of the radio badge 21 is obtained by weighted average processing using the target values. In one embodiment, each of the distances is a Euclidean distance. In another embodiment, each of the distances calculated is a Manhattan distance.

A field test was performed to verify the feasibility of the indoor localization system implementing the indoor localization method according to the present invention. The layout shown in FIG. 1 was used for the field test, in which the indoor space 20 was on a floor of a building that included a plurality of small rooms, and the beacons 22 were deployed in a hallway between the rooms.

Furthermore, to allow for easy monitoring of the field test and allow for quick response once a problem occurs, each of the beacons 22 was connected to one of two hosts 23 via one of the USB hubs 24. An equal number of the beacons 22 was connected to each host 23. The two hosts 23 acted like gateways to allow for easy program upgrades and updating. The power supplies 25 were used for the beacons 22 and the hosts 23 to provide a continuous source of power thereto, thereby avoiding the inconvenience of having to replace batteries.

Figure 3:
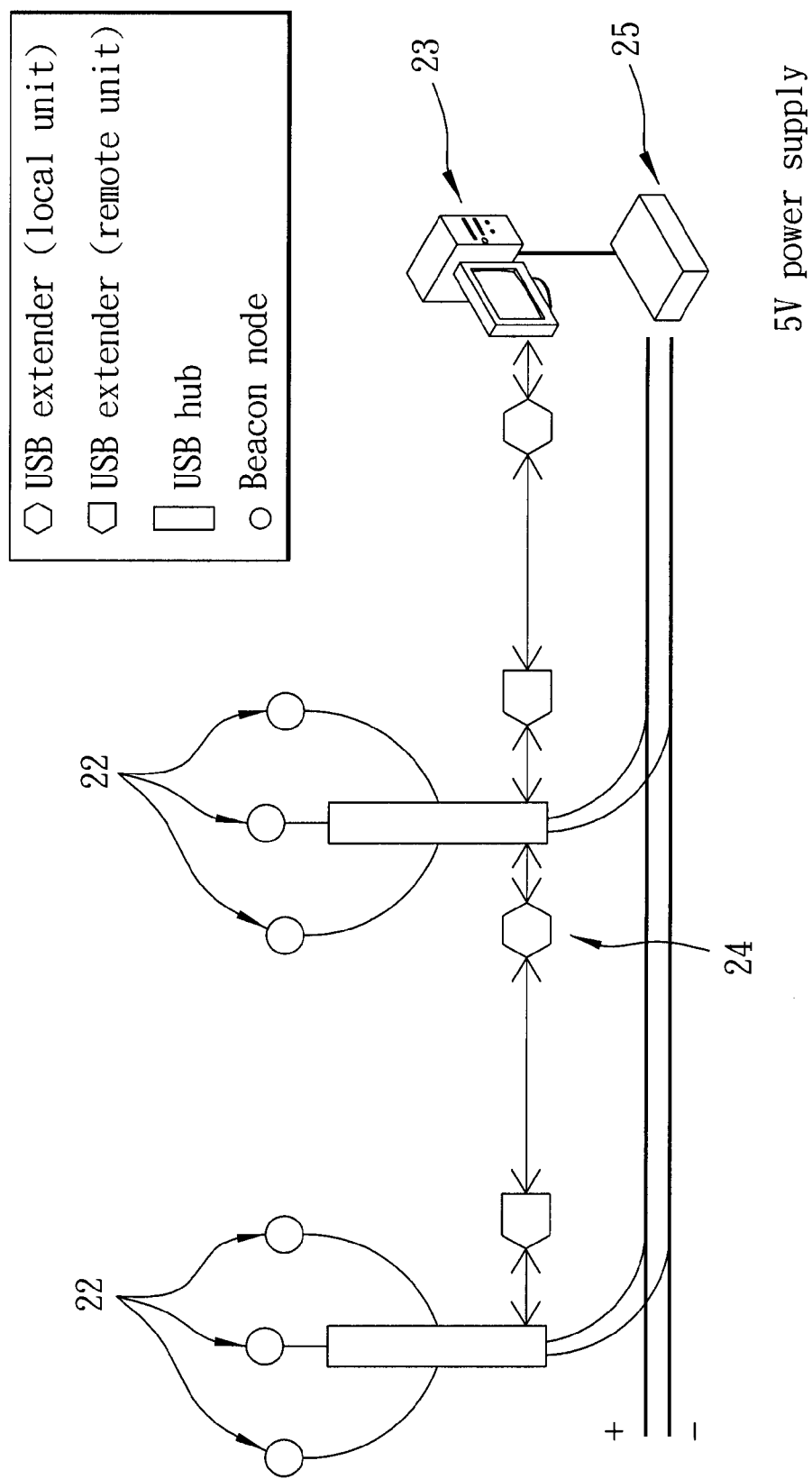
FIG. 3 is a schematic diagram, illustrating a chaining scheme used to connect adjacent beacons in the indoor localization system of the preferred embodiment.

The USB hubs 24 used in the field test included USB extenders to enable greater transmission lengths, that is, to overcome the transmission limitation of 5 meters for typical USB hubs. USB extenders enable a transmission length of 45 meters or greater, which, as is evident from FIG. 1, was needed for the field test. Moreover, in order to avoid redundant wiring in the indoor space 20, a chaining scheme as shown in FIG. 3 was used to connect adjacent beacons 22.

During the field test, the radio badge 21 received signals from an average of ten of the beacons 22.

From the results of the field test, it was determined that effective indoor localization is realized using the indoor localization system and method according to this invention.

Moreover, various conclusions as outlined below relating to factors that affect accuracy in indoor localization were reached during the aforementioned field test.

(1) Antenna Orientation of Each Beacon 22

It was determined from three different localization errors generated by conducting localization of three different localization routes that antenna orientation of each beacon 22 affects the accuracy of indoor localization.

Figure 4:
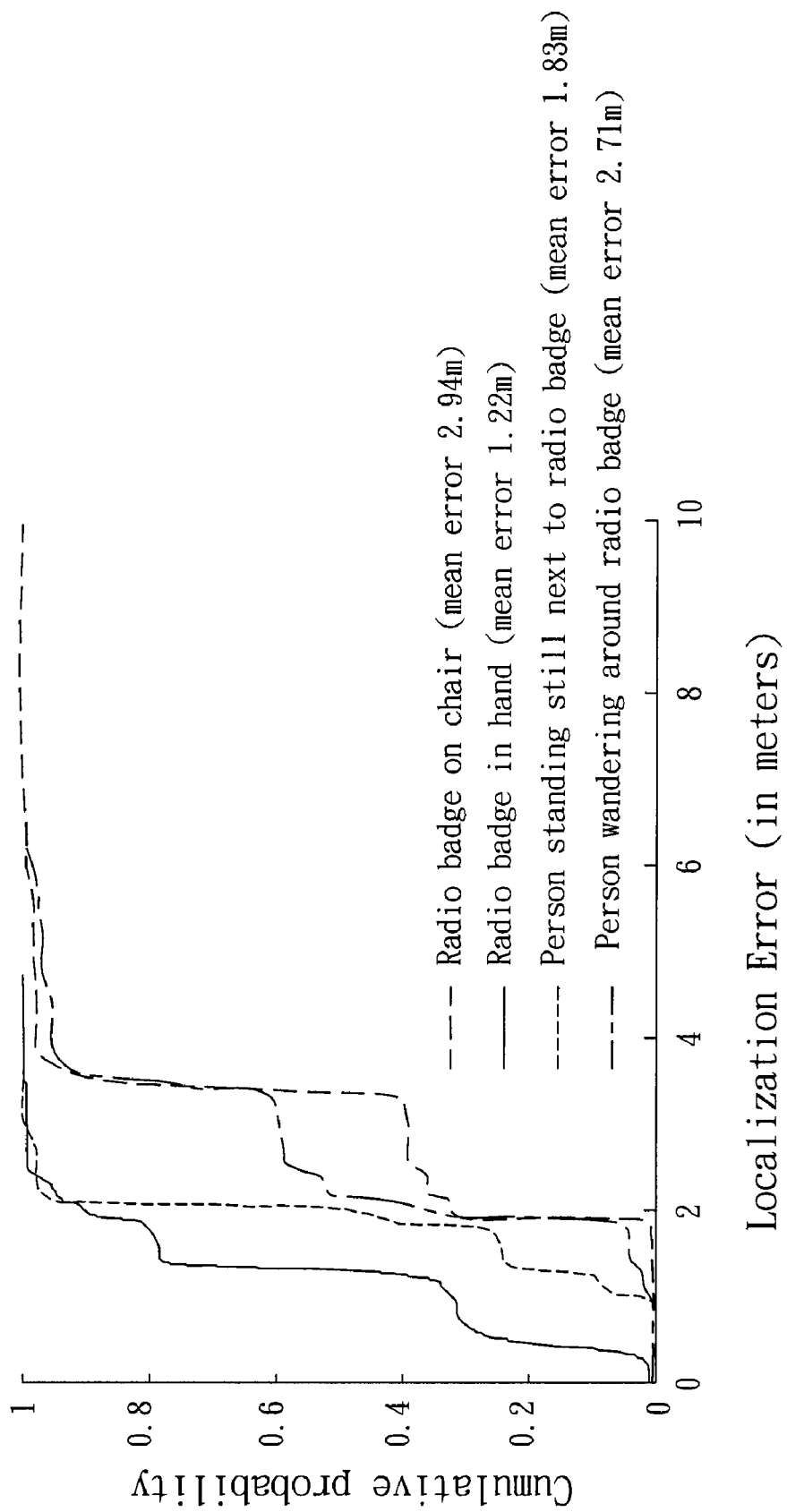
FIG. 4 is a graph of localization errors resulting from a field test performed under various conditions using the indoor localization system of the preferred embodiment.

(2) Noise Interference Caused by Indoor Moving Objects or Fixed Obstructions, and Change of Angle, Position, and Direction During Movement of the Radio Badge 21 when the Same is Carried As shown in FIG. 4, localization errors were measured for four different states of the radio badge 21 as follows: (a) the radio badge 21 placed on a chair, (b) the radio badge 21 held in the hand of a user; (c) a person standing still next to the radio badge 21; and (d) a person wandering around the radio badge 21. Hence, it is evident that different disposition states or environmental conditions of the radio badge 21 affect the accuracy of indoor localization.

(3) Distance from the Beacons 22

It was determined from the field test that as the distance from any one of the beacons 22 is reduced, a higher localization accuracy is achieved.

In the indoor localization system and method according to the present invention, the beacons 22 are configured such that the localization signals thereof are transmitted asynchronously. As a result, collisions among the localization signals transmitted by the beacons 22 are prevented, thereby ensuring successful delivery of the packets (i.e., the localization signals) from the beacons 22 to the radio badge 21. Ultimately, this enhances accuracy in the indoor localization system of the present invention.

With the invention thus explained, it is apparent that various modifications and variations can be made without departing from the spirit of the present invention. It is therefore intended that the invention be limited only as recited in the appended claims.

What is claimed is:

1. An indoor localization method to be implemented using an indoor localization system that includes a plurality of beacons deployed in an indoor space and each periodically transmitting a localization signal, and a radio badge carried by a tracked target for receiving the localization signals from the beacons, said indoor localization method comprising:

(a) configuring the beacons to transmit the localization signals thereof asynchronously;

(b) during a training phase, forming a plurality of first signal vectors respectively from the localization signals received by the radio badge at each of predetermined locations in the indoor space, and generating a signal ID value from the first signal vectors for each of the beacons from which the radio badge has received the localization signals;

(c) during a tracking phase, again forming a plurality of second signal vectors respectively from the localization signals received by the radio badge at a current location of the tracked target in the indoor space; and (d) calculating a plurality of distances between the second signal vectors formed during the tracking phase and corresponding to the current location, and the signal ID values corresponding to the predetermined locations; generating a plurality of reference values by dividing each of the distances by the number of the second signal vectors formed during the tracking phase; obtaining a plurality of target values from a subset of the reference values including a predetermined number of the smallest reference values; and obtaining an estimated position of the radio badge by weighted average processing using the target values.

2. The indoor localization method of claim 1, wherein, in step (a), a timing at which each of the beacons transmits the localization signal thereof is adjusted according to a comparison with timings at which neighboring beacons transmit localization signals, such that collisions among the localization signals transmitted by the beacons are prevented.

3. The indoor localization method of claim 1, further comprising, prior to step (b): (b0) partitioning the indoor space into a plurality of sections that serve as the predetermined locations, respectively.

4. The indoor localization method of claim 3, wherein, in step (b0), the sections of the indoor space are partitioned in a grid configuration.

5. The indoor localization method of claim 4, wherein, in step (b0), each of the sections is rectangular and extends for approximately 30 cm in a lengthwise direction.

6. The indoor localization method of claim 1, wherein each of the distances is a Euclidean distance.

7. The indoor localization method of claim 1, each of the beacons periodically transmitting the localization signal thereof at a predetermined signal-sending interval of 200 ms, wherein, in step (b), the training phase extends for 40 units of the signal-sending interval, such that each of the signal ID values is formed from 40 of the signal vectors.

8. The indoor localization method of claim 7, wherein, in step (c), the tracking phase extends for approximately 220 ms.

9. The indoor localization method of claim 1, wherein, in step (b), the signal ID value for each of the beacons from which the radio badge has received the localization signals is generated by averaging the signal vectors that are formed from the localization signals received at one of the predetermined locations from a corresponding one of the beacons during the training phase.

10. An indoor localization system for performing localization in an indoor space, said indoor localization system comprising:

a plurality of beacons deployed in the indoor space and each periodically transmitting a localization signal, said beacons being configured such that the localization signals thereof are transmitted asynchronously;

a radio badge carried by a tracked target in the indoor space for receiving the localization signals from said beacons; and a host communicatively coupled to said beacons and said radio badge;

wherein one of said radio badge and said host performs at least one step of an indoor localization method, and the other of said radio badge and said host performs the remaining steps of the indoor localization method, the indoor localization method including:

(a) during a training phase, forming a plurality of first signal vectors respectively from the localization signals received by said radio badge at each of predetermined locations in the indoor space, and generating a signal ID value from the first signal vectors for each of said beacons from which said radio badge has received the localization signals;

(b) during a tracking phase, again forming a plurality of second signal vectors respectively from the localization signals received by said radio badge at a current location of the tracked target in the indoor space; and (c) calculating a plurality of distances between the second signal vectors formed during the tracking phase and corresponding to the current location, and the signal ID values corresponding to the predetermined locations; generating a plurality of reference values by dividing each of the distances by the number of the second signal vectors formed during the tracking phase; obtaining a plurality of target values from a subset of the reference values including a predetermined number of the smallest reference values; and obtaining an estimated position of said radio badge by weighted average processing using the target values.

11. The indoor localization system of claim 10, wherein a timing at which each of said beacons transmits the localization signal thereof is adjusted according to a comparison with timings at which neighboring beacons transmit localization signals, such that collisions among the localization signals transmitted by said beacons are prevented.

12. The indoor localization system of claim 10, wherein the indoor space is partitioned into a plurality of sections that serve as the predetermined locations, respectively.

13. The indoor localization system of claim 12, wherein the sections of the indoor space are partitioned in a grid configuration.

14. The indoor localization system of claim 13, wherein each of the sections is rectangular and extends for approximately 30 cm in a lengthwise direction.

15. The indoor localization system of claim 10, wherein each of the distances is a Euclidean distance.

16. The indoor localization system of claim 10, wherein each of said beacons periodically transmits the localization signal thereof at a predetermined signal-sending interval of 200 ms, and in step (a), the training phase extends for 40 units of the signal-sending interval, such that each of the signal ID values is formed from 40 of the signal vectors.

17. The indoor localization system of claim 16, wherein, in step (b), the tracking phase extends for approximately 220 ms.

18. The indoor localization system of claim 10, wherein, in step (a), the signal ID value for each of said beacons from which said radio badge has received the localization signals is generated by averaging the signal vectors that are formed from the localization signals received at one of the predetermined locations from a corresponding one of said beacons during the training phase.

19. The indoor localization system of claim 10, wherein each of the localization signals transmitted by each of said beacons is a short packet containing an ID of said beacon.

20. The indoor localization system of claim 10, further comprising a universal serial bus hub and a universal serial bus extender for interconnecting said beacons and said host.

21. The indoor localization system of claim 10, further comprising a plurality of power supplies for providing power to said beacons and said host.

* * * * *